United States Patent
Wu

Patent Number: 5,184,911
Date of Patent: Feb. 9, 1993

[54] SADDLE MOUNTING STRUCTURE FOR A GOLF CART

[76] Inventor: Ching-Chang Wu, No. 35-1, Jih Hsin Street, Tu Cheng Hsiang Taipei Hsien, Taiwan

[21] Appl. No.: 749,353

[22] Filed: Aug. 23, 1991

[51] Int. Cl.⁵ .............................................. F16B 7/04
[52] U.S. Cl. .................................... 403/385; 403/400; 403/3; 280/DIG. 6; 248/98; 248/229; 248/912
[58] Field of Search ............ 403/385, 400, 97, 3, 403/4, 396, 399, 366, 362, 320, 110, 104, 373; 248/96, 98, 229, 911, 912, 316.1, 230; 280/DIG. 6; 273/32 E; 224/294

[56] References Cited

U.S. PATENT DOCUMENTS

| | | | |
|---|---|---|---|
| 1,798,572 | 3/1931 | Welton | 248/230 X |
| 2,777,707 | 1/1957 | Cloes | 280/DIG. 6 X |
| 2,876,027 | 3/1959 | Sulmonetti | 248/229 X |
| 4,103,853 | 8/1978 | Bannan | 248/230 X |
| 5,013,085 | 5/1991 | Craig | 403/97 X |
| 5,087,040 | 2/1992 | Wu | 280/DIG. 6 X |

FOREIGN PATENT DOCUMENTS 1261347 4/1961 France ................................ 403/400

*Primary Examiner*—Randolph A. Reese
*Assistant Examiner*—Harry C. Kim
*Attorney, Agent, or Firm*—Varndell Legal Group

[57] ABSTRACT

A saddle mounting structure comprising a connector for connecting a saddle to a golf cart's main frame, two symmetrical locating blocks for connecting said connector to the pillar of the saddle by a screw and a lock nut, two fastening plates for connecting the connector to the golf cart's main frame by a second screw. The connector has raised strips radially made on the outer wall surface alternatively engaged in a plurality of radial grooves on one symmetrical locating block for adjusting the angular position of the saddle relative to the golf cart's main frame.

4 Claims, 6 Drawing Sheets

SADDLE MOUNTING STRUCTURE FOR A GOLF CART

BACKGROUND AND SUMMARY OF THE INVENTION

The present invention relates to a saddle mounting structure and relates more particularly to a saddle mounting structure for fastening a saddle in the main frame of any of a variety of golf carts.

In the golf cart for carrying a golf bag, a saddle may be attached to the main frame thereof for sitting. The known saddle mounting structure is to fixedly secure a saddle to a golf cart's main frame. Once a saddle is fixed, its angular position relative to the main frame of the golf cart can not be adjusted or is difficult to adjust. The present invention is to provide a saddle mounting structure which is suitable for securing a saddle to any shape of golf cart's main frame. Further, the present invention permits a saddle to be conveniently adjusted to the desired angular position relative to the golf cart's main frame to which it is secured.

DETAILED DESCRIPTION OF THE PREFERRED EMBODIMENT

Figure 1:
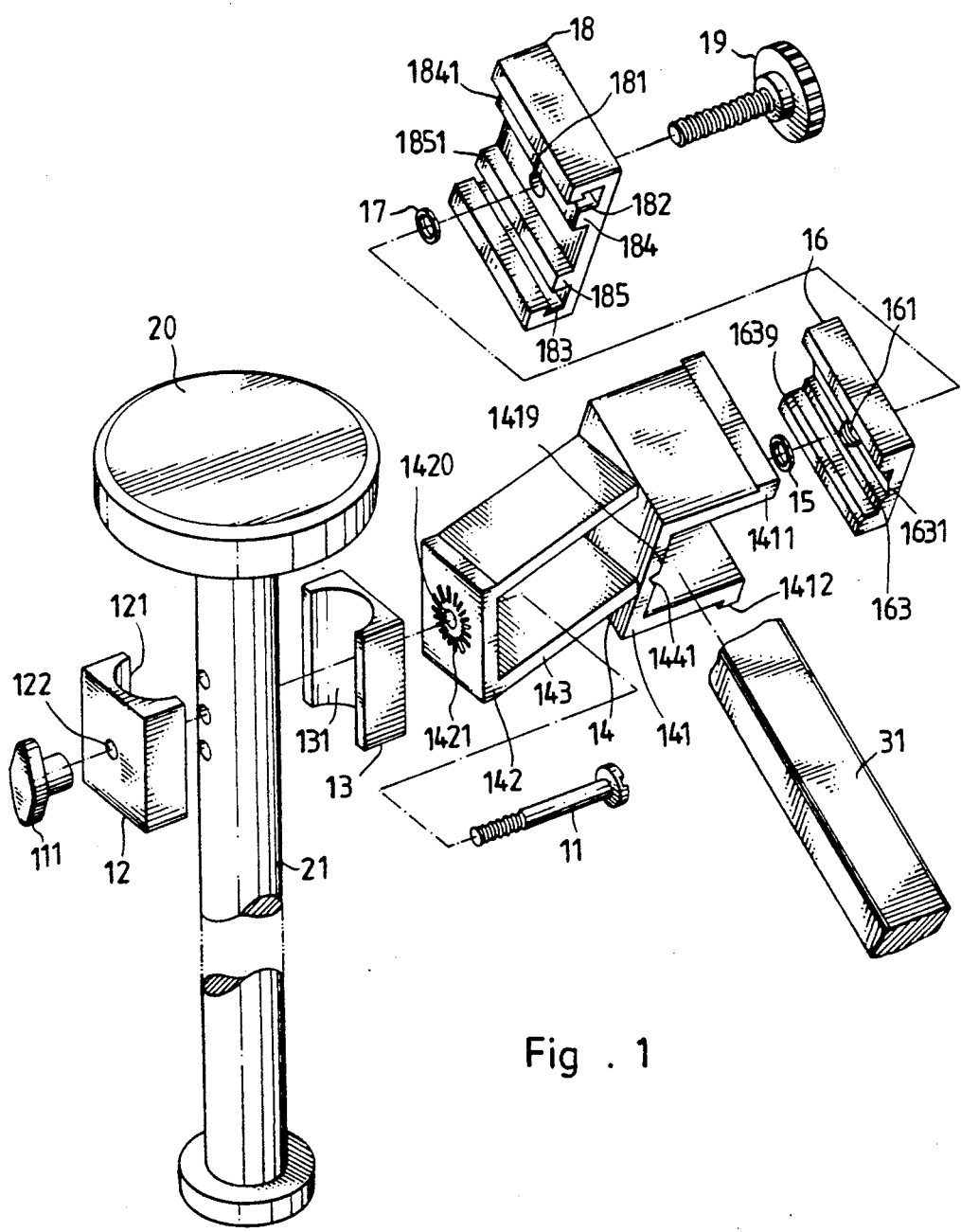
FIG. 1 is an exploded perspective view of the preferred embodiment of the saddle mounting structure of the present invention.
Figure 2:
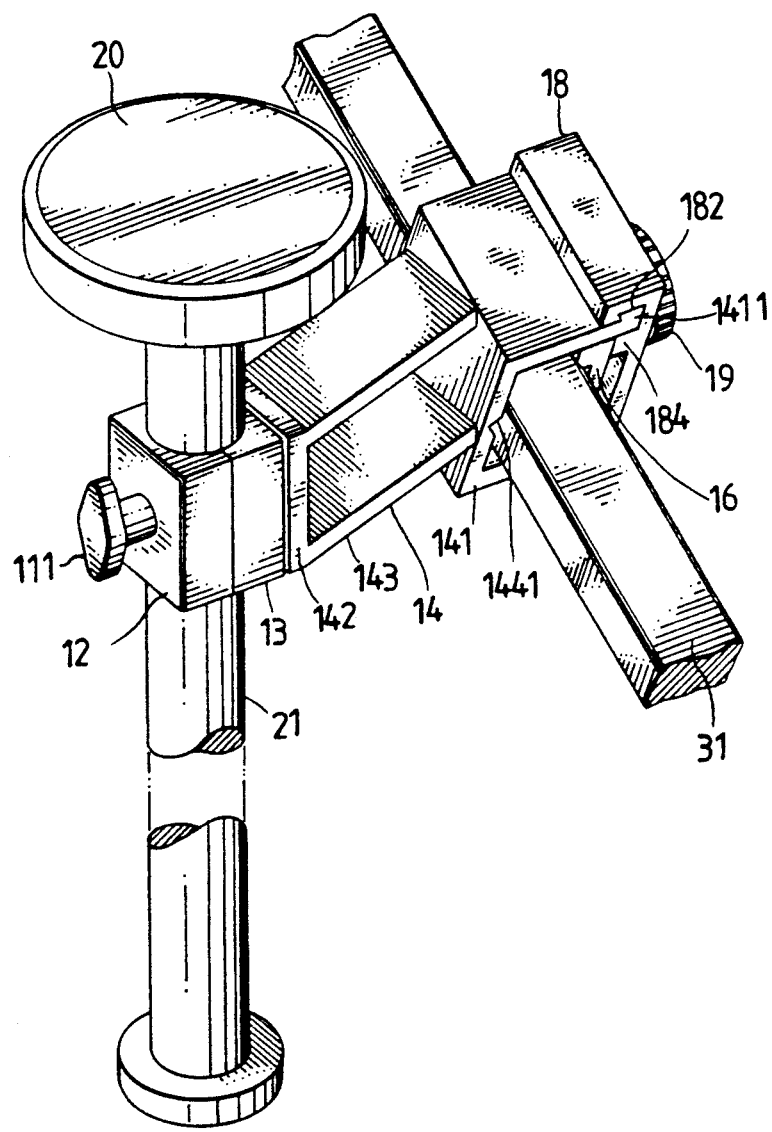
FIG. 2 is a perspective assembly view thereof.
Figure 3:
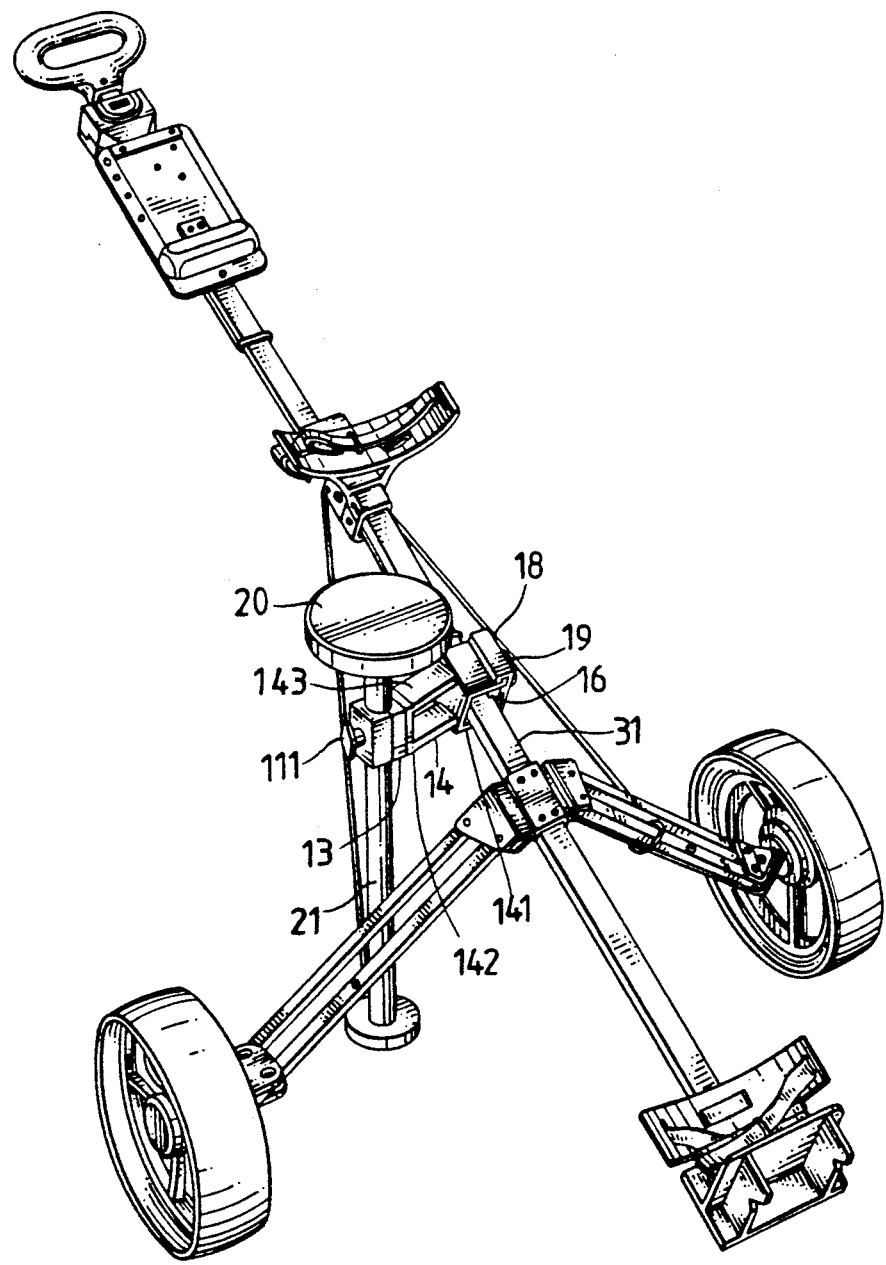
FIG. 3 is a perspective view of a golf cart showing the installation of the present invention therein.

Referring to FIGS. 1, 2 and 3, there is illustrated a saddle mounting structure for fastening a saddle 20 to a golf cart's main frame 31. The pillar 21 of the saddle 20 is attached with two symmetric locating blocks, namely, a first locating block 12 and a second locating block 13, and secured to a connector 14 by a first screw 11 and lock nut 111, which connector 14 is connected to the main frame 31 by a first fastening plate 16, a second fastening plate 18 and a second screw 19.

The connector 14 is comprised of a first connecting block 141 and a second connecting block 143. The second connecting block 143 has a vertical end wall 142 which has a through-hole 1420 at the center and a plurality of raised strips 1421 radially raised from the outer wall surface thereof. The first connecting block 141 is made in a substantially U-shaped structure having two hooked terminal ends 1411 and 1412, and a V-groove 1441 on the inner wall surface 1419 thereof at the middle in longitudinal direction. The first and second locating blocks 12 and 13 each defines therein a groove 121 or 131 in longitudinal direction and has a through-hole 122 or 132 (Please refer to FIG. 5) at the center in direction vertical to said groove 121 or 131. The second locating block 13 further comprises a plurality of radial grooves 1321 (Please refer to FIG. 5) radially made on the outer wall surface thereof around the through-hole 132 corresponding to the raised strips 1421 on the vertical end wall 142 of the second connecting block 143 of the connector 14. The first fastening plate 16 has two opposite, chamfered edges 1638 and 1639, a channel 163 longitudinally disposed between said two chamfered edges, a V-groove 1631 longitudinally made in said channel at the middle, and a bolt hole 161 through said V-groove 1631 at the middle. The second fastening plate 18 has a bolt hole 181 at the center for fastening the screw 19, two elongated retaining grooves 182 and 183 longitudinally disposed at one side at two opposite locations for engaging the two hooked terminal ends 1411 and 1412 of the first connecting block 141 of the connector 14, and two rails 184 and 185 longitudinally disposed within said two elongated retaining grooves 182 and 183 and spaced from each other. The two rails 184 and 185 on the second fastening plate 18 each has a top edge 1841 or 1851 for supporting the first fastening plate 16.

Figure 5:
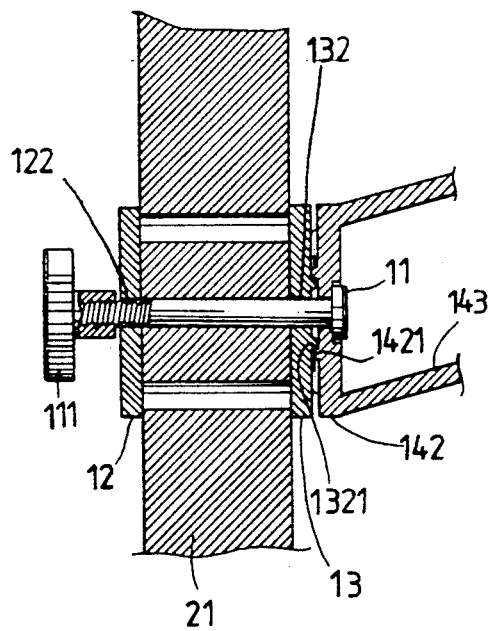
FIG. 5 is a sectional view showing that the second fastening block of the connector is secured to the two locating blocks and attached to the pillar of the saddle by the first screw and the lock nut.
Figure 4:
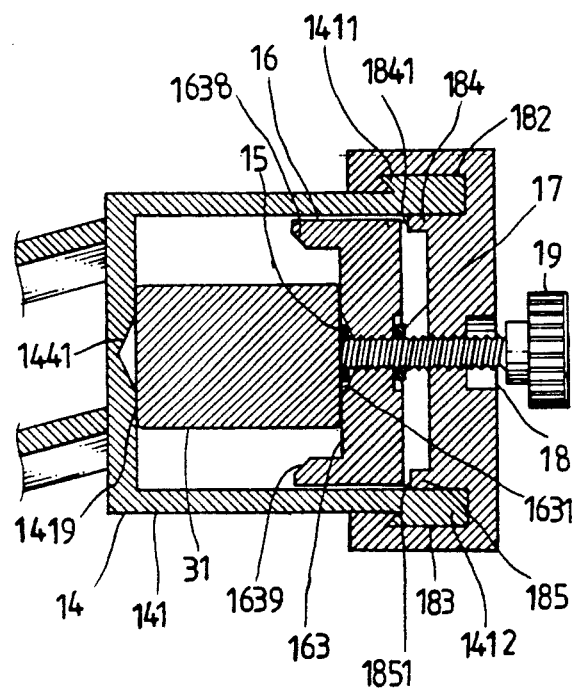
FIG. 4 is a sectional view showing that the first connecting block of the connector is connected with the second fastening plate with the first fastening plate retained therein and secured to the golf cart's main frame by the second screw.

Referring to FIGS. 4 and 5, the two locating blocks 12 and 13 are attached to the saddle 20 with the pillar 21 received inside the grooves 121 and 131 thereof. The screw 11 is inserted from the through-hole 1420 on the vertical end wall 142 of the second connecting block 143 of the connector 14, through the through-hole 132 on the second locating block 13, a through-hole on the pillar 21 and the through-hole 122 on the first locating block 12, and tightly fastened up with the lock nut 111, permitting the connector 14 to be tightly connected to the saddle 20. The first connecting block 141 of the connector 14 is attached to the golf cart's main frame 31 at one side, and then, the first fastening plate 16 is attached to the golf cart's main frame 31 at an opposite side and received inside the first connecting block 141 of the connector. Then, attach the second fastening plate 18 to the first connecting block 141 of the connector 14 by engaging the two hooked terminal ends 1411 and 1412 in the two retaining grooves 182 and 183, permitting the top edges 1841 and 1851 of the two rails 184 and 185 to respectively stopped against the first fastening plate 16. Then, fasten the second screw 19 in the bolt hole 161 on the first fastening plate 16 and the bolt hole 181 on the second fastening plate and tightly stopped against the main frame 31 to firmly secure, the first and second fastening plates 16 and 18 and the first connecting block 141 of the connector 14 to the main frame 31. Further, there are provided two faskets 15 and 17 respectively mounted on the second screw 19 and attached to the bolt hole 161 on the first fastening plate 16 at two opposite ends. By means of the aforesaid procedure, the saddle 20 is firmly secured to the golf cart's main frame 31.

Figure 6:
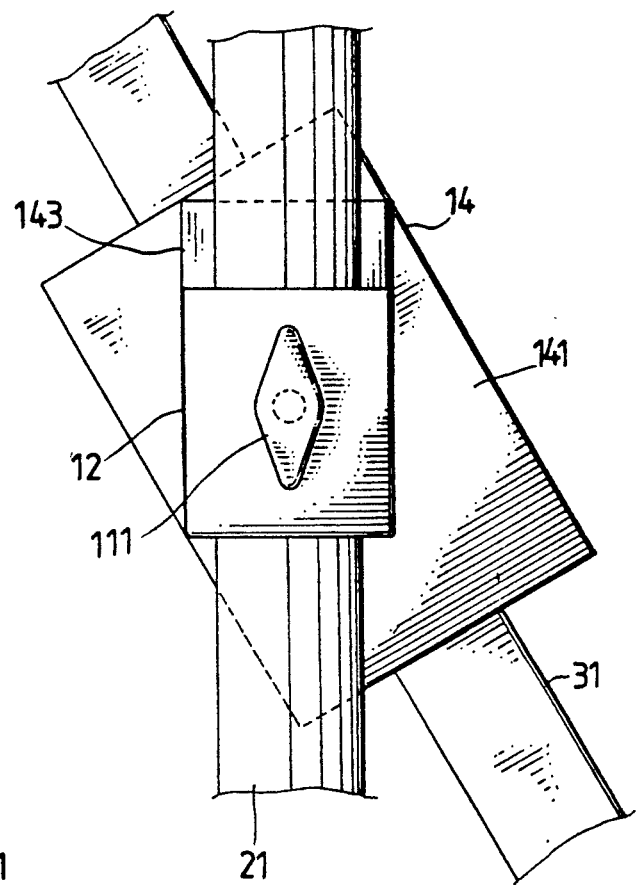
FIGS. 6 and 7 illustrate that the angular position of the saddle relative to the golf cart's main frame is adjusted by alternatively changing the engagement of the raised strips of the connector in the radial grooves of the second locating block.
Figure 7:
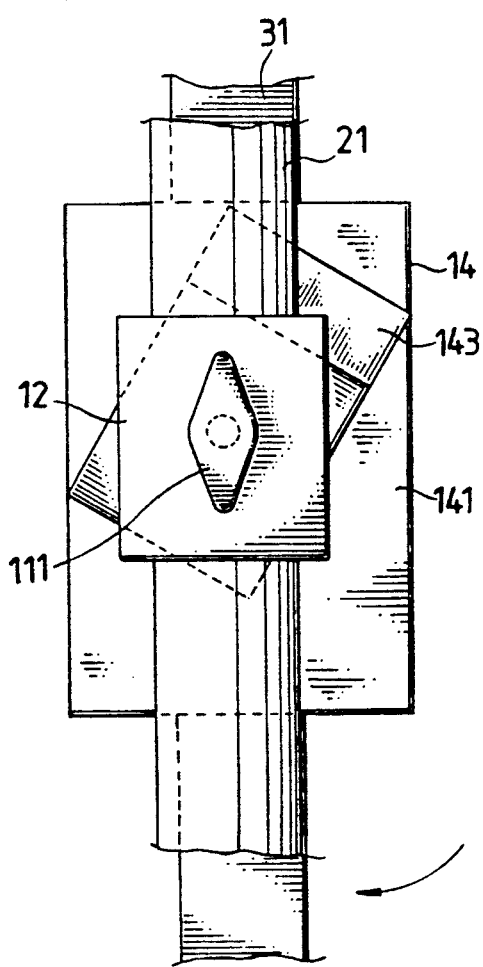

Referring to FIGS. 6 and 7, the angular position of the saddle 20 relative to the golf cart's main frame 31 can be adjusted by changing the engagement of the raised strips 1421 on the vertical end wall 142 of the second connecting block 143 of the connector 14 in the radial grooves 1321 on the second locating block 13.

Figure 8:
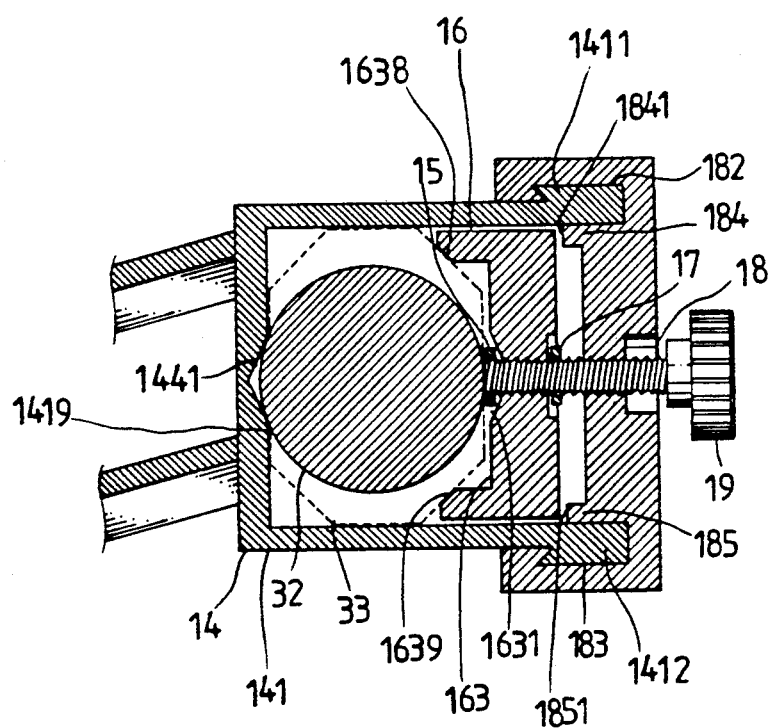
FIG. 8 illustrates that the connector and the two fastening plates can be firmly secured to a golf cart's main frame which has either a circular or a hexagonal cross section.

Referring to FIG. 8, the connector 14 can be connected to any of a variety of golf carts' main frames. By means of the effect of the V-groove 1441 on the inner wall surface 1419 of the first connecting block 141 of the connector 14 and the V-groove 1631 on the first fastening plate 16, the connector 14 and the first and second fastening plates 16 and 18 are firmly secured by the second screw 19 to a main frame 32 which has a circular cross section. By means of the arrangement of the chamfered edges 1638 and 1639 on the first fastening plate 16, the connector 14 and the first and second fastening plates 16 and 18 are firmly secured by the second screw 19 to a main frame 33 which has a hexagonal cross section.

I claim:

1. For securing the pillar of a saddle to a golf cart's main frame, a saddle mounting structure comprising:
   a connector for connecting a saddle to a golf cart's main frame, said connector comprised of a first connecting block secured to a second connecting block, said second connecting block having a vertical end wall, said vertical end wall having a through-hole at the center, said first connecting block being made in a substantially U-shaped structure having two hooked terminal ends and a V-groove on the inner wall surface thereof at the middle in longitudinal direction;
   a first locating block and a second locating block for securing said connector to a saddle's pillar, said first and second locating blocks being symmetrical and each defining therein a groove in longitudinal direction and a through-hole at the center, said second locating block having a plurality of radial grooves radially made on the outer wall surface around the through-hole thereof;
   a first fastening plate and a second fastening plate for securing said connector to a golf cart's main frame, said first fastening plate having a channel longitudinally disposed at one side, a bolt hole at the center, said second fastening plate having a bolt hole at the center, two elongated retaining grooves longitudinally disposed at one side at two opposite locations, and two rails longitudinally disposed within said two elongated retaining grooves and spaced from each other;
   a first screw and a lock nut for securing said connector and said first and second locating block to a saddle's pillar;
   a second screw for securing said connector and said first and second fastening plate to a golf cart's main frame; and
   wherein said first screw is inserted through the through-hole on said vertical end wall, the through-hole on said second locating block, a through-hole on a saddle's pillar and the through-hole on said first locating block and tightly fastened up with said lock nut to firmly secure said connector to said saddle's pillar; said first connecting block of said connector and said first fastening plate are respectively attached to a golf cart's main frame at two opposite sides with said first fastening plate received inside said first connecting block of said connector and, said second fastening plate is attached to said connector and firmly secured in position by said second screw, permitting said to hooked terminal ends to be respectively retained in said two retaining grooves.

2. The saddle mounting structure of claim 1, wherein said vertical end wall of said second connecting block of said connector has a plurality of raised strips radially raised from the outer wall surface thereof and alternatively engaged in a plurality of radial grooves on said second locating block for adjusting the angular position of said connector relative to said saddle's pillar.

3. The saddle mounting structure of claim 1, wherein said first fastening plate has a V-groove longitudinally made on the channel thereof to match with the V-groove on said first connecting block for securing to a golf cart's main frame which has a circular cross-section.

4. The saddle mounting structure of claim 1, wherein said first fastening plate has two chamfered edges raised from the channel thereof at two opposite sides to match with the flat inner wall on said first connecting block of said connector for securing a golf cart's main frame which has a hexagonal cross-section.

* * * * *